United States Patent Office 3,161,673
Patented Dec. 15, 1964

3,161,673
PROCESS FOR THE PRODUCTION OF CIS-3-HALO-ACRYLIC COMPOUNDS
Thomas H. Vaughn, Tenafly, N.J., assignor to Union Carbide Corporation, a corporation of New York
No Drawing. Filed Apr. 27, 1962, Ser. No. 190,813
11 Claims. (Cl. 260—539)

The present invention relates to a novel process for preparing cis-3-haloacrylic compounds, particularly cis-3-haloacrylic acid, to the substantial exclusion of the corresponding trans isomer.

It is known that a mixture of cis- and trans-3-chloracrylic acids can be obtained by reacting hydrochloric acid with propiolic acid, as taught, for example, by Backer et al. in Rec., Trav. Chem., 54 167 (1935). While the cis and trans isomers may be separated from each other by fractional crystallization as there disclosed, recent discoveries of high and variegated biological activity of the cis isomer as opposed to moderate activity of the trans isomer, have created a need for a less cumbersome, less time-consuming, and cheaper process for the production of cis-3-chloracrylic acid. For example, when both isomers were tested as soil fungicides against *Rhizoctonia solania* and *Fusarium oxysporum* f. *lycopersici* infesting artificially inoculated soil, at a rate corresponding to 150 pounds of chemical per acre, the cis isomer prevented all mycelial growth of fungus while application of the trans isomer allowed about one-half of the soil surface to become covered with mycelial growth (a control test using no chemical resulted in complete coverage of the soil surface by mycelia).

The present process achieves the production of 3-haloacrylic compounds with a substantially higher yield of the cis isomer than heretofore possible, and, in preferred embodiments thereof, results in the production of pure cis isomer with substantially quantitative conversion of the starting materials.

In a broad aspect, the process of this invention comprises the cis-directed addition of a halogen acid to the triple bond of a propiolic acid compound by reacting the propiolic acid compound with the halogen acid, either hydrochloric acid or hydrobromic acid, in contact with a catalytically significant amount of a metal salt wherein the metal is a member of the group consisting of copper, chromium, mercury, manganese, iron, zinc, cadmium, and aluminum.

The term "propiolic acid compound" as used throughout this specification is intended to include, in addition to propiolic acid, derivatives of the carboxylic group thereof, such as its salts, its anhydride and its acid halides, which are readily hydrolyzed to the free propiolic acid during the process of this invention by the halogen acid. The term "propiolic acid compound" is further intended to embrace such carboxylic compounds as esters of, and amides corresponding to, propiolic acid which can be used as starting materials in accordance with this invention inasmuch as the halogen acid will, at the preferred reaction temperatures, cleave such esters and amides to the free propiolic acid during the process of this invention. It is also possible to so adjust the operating conditions utilized in the invention that no hydrolysis, or cleaving, of such propiolic acid ester or amide starting material occurs, for example by operating below about 50° C., and via a predominantly cis-directed addition of halogen acid, obtain the corresponding ester or amide of cis-3-haloacrylic acid. The propiolic acid compounds utilizable as starting materials thus comprise the structure (I)     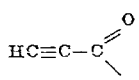

which structure is characterized by the presence of a terminal triple bond adjacent to a carboxylic carbon atom and where in the free carboxylic valence may be taken up by hydroxy; or —X where X is halogen such as Cl or Br; or, in inorganic esters, by such groups as —OM where M is a monovalent metal or —ON+(n−1) where n is the valence state of polyvalent metal N and the remaining valences (n−1) can be satisfied by one or more of the structure (I) above linked to N through an oxygen atom; or, in organic esters, by such groups as —OR and

wherein R and $R^1$ represent such moieties as hydrocarbyl free of acetylenic unsaturation, e.g., alkyl and aryl of from 1 to about 10 carbon atoms, and both $R^1$ radicals together can represent the hydrocarbyl portion of an N-heterocycle, or where both $R^1$ radicals can be hydrogen.

It is understood that, in the preferred mode of conducting the process of this invention, the starting material will be hydrolyzed to propiolic acid and that, therefore, the particular group satisfying the free carboxylic valence in structure (I) above plays no essential part in this invention.

The propiolic acid compound starting material can be in the form of the compound per se, or a solution thereof, or a slurry containing such compound in dispersed form, as obtained for example, by the carbonation of the corresponding acetylide.

The halogen acid to be reacted with the propiolic acid, or derivative thereof, can be either hydrochloric acid or hydrobromic acid and is preferably employed in the form of an aqueous solution containing from about 10 to about 50 weight precent of acid. In general, the mole ratio of halogen acid to propiolic acid compound can vary from about 1:1, or less, to about 3:1, or more. When it is desired to obtain an alkali metal salt, for example, of cis-3-chloroacrylic acid directly from the corresponding alkali metal salt of propiolic acid, equimolar quantities of the halogen acid and propiolic acid salt are advantageously employed in order to facilitate or obviate subsequent neutralization steps. In general, however, some excess of halogen acid, e.g. 2 to 3 moles of halogen acid per mol of propiolic acid compound, is preferably used to insure complete reaction of the propiolic acid compound.

The salient feature in the process of this invention is the use, in catalytically significant amounts, of a metal salt wherein the metal is selected from the groups VIB, VIIB, VIII, IB, IIB, and IIIA of the Periodic Table of the Elements as shown in Handbook of Chemistry, Lange, editor, ninth edition, pages 56 and 57. Illustrative of utilizable metal salts are those containing cupric ion, cuprous ion, mercuric ion, mercurous ion, chromic ion, chromous ion, manganic ion, ferric ion, ferrous ion, zinc ion, cadmium ion, aluminum ion, and the like. While these cations improve the over-all yield of cis-3-haloacrylic compounds, sometimes merely by catalyzing the addition of halogen acid to the triple bond of the propiolic acid compound without exerting substantial directive (i.e. cis or trans) effects, use of the preferred metal salts, viz. those containing chromium and mercury, or the most preferred metal, copper, have been found to result in substantially complete conversion of the starting material to the cis isomer to the substantial or complete exclusion of the trans form. The anion of the said metal salt appears to play no particular part in this invention and can be any inert inorganic anion, such as chloride, bromide, sulfate, sulfite, etc.

The amount of metal salt required to exert catalytically significant effects depends to some extent on other operating variables, for example, temperature. In general, from about .05 mole percent to about 20 mole percent of metal salt, based on propiolic acid starting material, is useful, but from 2 to 10 mole percent of metal salt, based on propiolic acid starting material, are most satisfactory under normal operating conditions. At 50° C., for example, the use of 6 mole percent of cuprous chloride has been found to be quite sufficient for a rapid and complete reaction.

The temperature at which the reaction is conducted is limited by two major factors. It is known that the cis-3-haloacrylic compounds isomerize rapidly to the trans form at elevated temperatures, e.g. above about 100° C., at which temperatures the double bond appears to be rendered less rigid to allow some rotation, with the more stable trans isomer predominating in the resulting equilibrium cis-trans mixture. On the other hand, at temperatures much below 0° C., addition of the halogen acid to the propiolic acid compound becomes somewhat sluggish and, while no isomerization to the trans form occurs at such low temperatures, a temperature between about 0° C. and about 110° C. is generally preferred. It can be seen that selection of the optimum operating temperature will be based on balancing the deleterious effect of high-temperature isomerization to the trans form against the advantageous effect of more rapid halogen acid addition at higher temperatures. I have found that, using the preferred catalytic metal salts, the optimum temperature is generally between about 50° C. and 110° C. As the reaction is exothermic, cooling means need to be provided in order to take up the heat evolved and maintain the reaction temperature within the desired range.

It will be apparent to one skilled in the art that the process of this invention can be carried out in batchwise fashion or continuously. When operating batchwise, reaction times of from about 30 minutes to about 24 hours can be employed, but under preferred operating conditions, reaction times of from about 15 minutes to about 1 hour are generally sufficient for complete reaction. As was noted above, a high operating temperature will usually make possible relatively short reaction times when the preferred catalytic quantities of metal salt are used. When operating continuously, the contact times in a tubular reactor will preferably be from about 1 minute to about 15 minutes, when conducting the reaction near the optimum temperature. The particular equipment employed to carry out the process of this invention can be readily selected by one skilled in the art from the various well-known batch reactors, stirred reactors, tubular reactors, and the like.

While the aqueous halogen acid employed in the process generally provides a suitable reaction medium, inert organic solvents may also be additionally employed. For example, the starting propiolic acid compound can be dissolved, or suspended to form a slurry, in an inert organic solvent, such as xylene, toluene, kerosene, paraffinic hydrocarbons, such as heptane, or cycloparaffinic hydrocarbons such as cyclopentane.

Recovery of the desired cis-3-halocarylic compound from the reaction mixture can be accomplished by known means, e.g. extraction with a suitable extracting solvent such as chloroform, benzene, toluene, or xylene, and purification of the cis-3-haloacrylic compound may be effected by recrystallization from a suitable solvent such as the extracting solvents or hexane, or by fractional distillation under vacuum.

*Example I*

A 250-milliliter, stirrer-equipped flask was flushed with nitrogen and charged with 81 milliliters of concentrated (12 N) hydrochloric acid and 3 grams of cuprous chloride. Then 33.8 grams of propiolic acid were slowly added under a nitrogen atmosphere, with stirring, over a 25-minute period, the temperature being maintained at 8–12° C. The resulting mixture was stirred for 24 hours at 0° C. to insure complete reaction and the resulting reaction product mixture was extracted six times with 100-milliliter portions of chloroform. After evaporation of the chloroform and recrystallization from hexane, 42.1 grams of cis-3-chloroacrylic acid, having a melting point of 60–62° C., were recovered, representing an 82 percent yield base on propiolic acid, with no trans isomer present.

*Example II*

One gram-mole of propiolic acid was slowly added to 350 grams of concentrated (12 N) hydrochloric acid containing 0.025 mole of cupric sulfate. The addition was carried out over a one-hour period, while maintaining a reaction temperature of 35° C. to 40° C. After stirring the reaction mixture for an additional hour at this temperature, the reaction product was extracted and distilled to give a substantially quantitative yield of cis-3-chloracrylic acid.

*Example III*

One gram-mole of propiolic acid was added, over a one-hour period, to 350 milliliters of concentrated (12 N) hydrochloric acid containing 0.025 mole of chromic chloride, while maintaining a reaction temperature of 35° C. to 40° C. The reaction mixture was maintained at this temperature, with stirring, for an additional hour, and the reaction product extracted and distilled to give cis-3-chloracrylic acid in a yield corresponding to 75 percent of the theoretical, with no trans isomer present.

The use of manganese chloride, aluminum trichloride, and cadmium chloride, respectively, in place of cuprous chloride resulted in 80 to 90 percent conversion of the starting propiolic acid to 3-chloroacrylic acid, with the cis isomer predominating.

*Example IV*

To a mixture of 6 grams of cuprous chloride and 164 milliliters of concentrated (12 N) hydrochloric acid were added, over a one hour period, 68 grams of sodium propiolate. The temperature of the reaction mixture was maintained at 0 to 10° C. during the addition. The reaction mixture was held at this temperature for an additional 35 minutes, with stirring, after which time the mixture was extracted 5 times with 100-milliliter portions of chloroform. After evaporation of the chloroform there were recovered 83.3 grams of product containing 77 weight percent cis-3-chloroacrylic acid. The trans isomer was absent, as determined by infrared analysis.

Methyl cis-3-chloroacrylate is prepared similarly by employing 62 grams of methyl propiolate in place of the sodium propiolate and conducting the reaction under conditions which avoid substantial hydrolysis of the starting ester. At temperatures above about 50° C. the methyl propiolate is hydrolyzed to propiolic acid by hydrochloric acid.

*Example V*

A mixture of 5.77 grams of cuprous chloride and 158 milliliters of concentrated (12 N) hydrochloric acid was heated to 50° C., 90 grams of crude sodium propiolate obtained by carbonating 46.5 grams of sodium acetylide were added to the mixture over a period of 14 minutes, and the mixture was maintained with stirring at 50° C. for 16 minutes. The reaction mixture was extracted 6 times with 100 milliliter portions of chloroform. After evaporation of the chloroform there were recovered 70.1 grams of product containing 88 weight percent of cis-3-chloroacrylic acid, with no trans-3-chloroacrylic acid being present.

*Example VI*

A suspension of crude sodium propiolate in 200 milliliters of xylene, obtained by carbonating 57 grams of sodium acetylide, was added with stirring over a twenty-minute period to a mixture of 7.16 grams of cuprous chloride and 195.6 grams of concentrated hydrochloric acid, the reaction mixture being maintained at 50° C. The reaction mixture was held at 45–54° C. for an additional 26 minutes. The xylene and aqueous phases were separated and the aqueous phase was extracted 4 times with 100-milliliter portions of chloroform. The chloroform extracts were combined with the xylene phase and the resulting mixture evaporated to obtain 119 grams of product containing 52 weight percent cis-3-chloroacrylic and 1 weight percent trans-3-chloroacrylic acid. The acid could be further purified by recrystallization from hexane or by vacuum distillation.

*Example VII*

A 62.6 grams sample of crude sodium propiolate containing 41.8 percent (0.285 mole) of sodium propiolate, the balance consisting of inert sodium salts and diethyl diethylene glycol, was added over a seven-minute period to 112 milliliters of concentrated (12 N) hydrochloric acid containing 11.2 grams (0.041 mole) of mercuric chloride, while maintaining a reaction temperature of 50–54° C. After the seven-minute period, the reaction mixture was maintained at this temperature for an additional hour by external cooling. After allowing the reaction mixture to cool to room temperature, it was filtered and the filter cake washed with water to allow all the water-soluble salts to pass into the filtrate. The filtrate was extracted with chloroform and the extracts were vacuum distilled through a twelve-inch Vigreux column to obtain a product containing cis-3-chloroacrylic acid in a yield corresponding to 66.4 percent of theory, based on starting sodium propiolate. The trans isomer content of the product was less than eight percent, based on sodium propiolate.

What is claimed is:

1. The process for the cis-directed addition of a halogen acid selected from the group consisting of hydrochloric and hydrobromic acids to the triple bond of a hydrolyzable propiolic acid compound selected from the group consisting of propiolic acid and carboxylic derivatives thereof having the formula

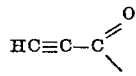

wherein the free carboxylic valence is satisfied by a member chosen from the class consisting of —OM where M is a monovalent metal and —OR where R is alkyl of from 1 to 10 carbon atoms which process comprises reacting, at a temperature of from 0° C. to 110° C., the propiolic acid compound with the halogen acid in the contacting presence of a catalytically significant amount of a metal salt which is hydrolyzed under the reaction conditions and yields, under the reaction conditions, a cation of a metal selected from the group consisting of copper, chromium, mercury, manganese, iron, zinc, cadmium, and aluminum.

2. The process of claim 1 wherein said metal salt is a cupric salt.

3. The process of claim 1 wherein said metal salt is a cuprous salt.

4. The process of claim 1 wherein said metal salt is a mercuric salt.

5. The process of claim 1 wherein said metal salt is a chromic salt.

6. The process for producing cis-3-chloroacrylic acid which comprises reacting, at a temperature of from 0° C. to 110° C. propiolic acid with hydrochloric acid in the presence of a catalytically significant amount of a copper salt which is hydrolyzed under the reaction conditions and yields, under the reaction conditions, a copper cation.

7. The process for producing cis-3-chloroacrylic acid which comprises reacting, at a temperature of from 0° C. to 110° C. sodium propiolate with hydrochloric acid in the presence of a catalytically significant amount of a copper salt which is hydrolyzed under the reaction conditions and yields, under the reaction conditions, a copper cation.

8. The process for producing cis-3-chloroacrylic acid which comprises reacting propiolic acid with hydrochloric acid in the presence of a catalytically significant amount of cuprous chloride, at a temperature of from 0° C. to 110° C.

9. The process for producing cis-3-chloroacrylic acid which comprises reacting propiolic acid with hydrochloric acid in the presence of a catalytically significant amount of cupric chloride, at a temperature of from 0° C. to 110° C.

10. The process for producing cis-3-chloroacrylic acid which comprises reacting sodium propiolate with hydrochloric acid in the presence of a catalytically significant amount of cuprous chloride, at a temperature of from 0° C. to 110° C.

11. The process for producing cis-3-chloroacrylic acid which comprises reacting sodium propiolate with hydrochloric acid in the presence of a catalytically significant amount of cupric chloride, at a temperature of from 0° C. to 110° C.

References Cited in the file of this patent

Backer, Rec. Trav. Chim., Vol. 54, pages 167–170 (1935).